Aug. 19, 1930.   J. F. DE TÓVÁROS   1,773,262
CURRENT COLLECTOR FOR ELECTRIC VEHICLES

Filed Aug. 1, 1928

Inventor:
Julius Fischel de Tóváros

Patented Aug. 19, 1930

1,773,262

UNITED STATES PATENT OFFICE

JULIUS FISCHER DE TÓVÁROS, OF BUDAPEST, HUNGARY

CURRENT COLLECTOR FOR ELECTRIC VEHICLES

Application filed August 1, 1928, Serial No. 296,812, and in Hungary August 8, 1927.

This invention relates to a current collector for electric vehicles and of the kind wherein an axially elongated collecting member which is formed of plates so as to present a plurality of flat contact surfaces, is supported at the ends on the trolley frame, means being provided for maintaining any of the contact surfaces in contact with the overhead wire.

In known devices of this kind separate bearing members are provided which are secured to the ends of the collector.

The object of the present invention is to simplify the construction of the collector, and the invention consists in shaping the ends of the collecting member so that no other bearing elements, bar wearing bushes, if required, need be employed in addition to the means for maintaining any particular contact surface in operation.

Figure 1:
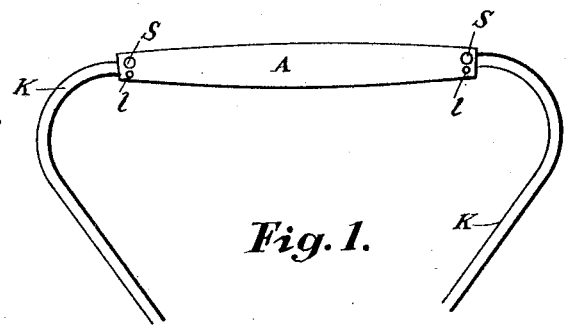
Figures 2, 3, 5, 6:
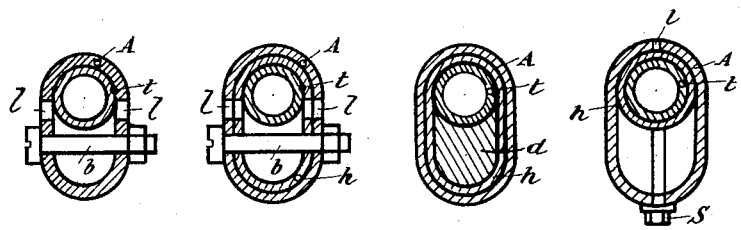

Fig. 1 of the accompanying drawings represents a front view of the collector and the trolley frame, Fig. 2 is a cross-section on an enlarged scale taken at one end of the collector, and Figs. 3-7 are cross-sections showing different modifications in the construction of the collector.

The axially elongated collecting member A is composed of plates which are combined so as to form a hollow structure having a plurality of flat contact surfaces for co-operation with the overhead wire. The collecting member is threaded on the horizontal member $t$ of the trolley frame K and tapers towards the ends where the plates are shaped so as to form bearing members whereby the collector can be directly supported on the trolley frame.

The ends of the collecting member shown in Fig. 1 are of substantially oval cross-section, and the supporting member fits snugly in the curvature at either end of the oval. In order to retain the supporting member $t$ at one of the ends of the oval, i. e., in an asymmetric position relative to the collecting member, cross-bolts $b$ are fitted in apertures $l$ in the sleeve. Two sets of apertures $l$ are provided so as to allow the bolt to be shifted for retaining the member $t$ in the sleeve in either end position. By this arrangement both contact faces of the collecting member will be available for use.

Wearing bushes or sleeve $h$ of any suitable material may be interposed between the bearing surfaces of the members A and $t$, as shown in Fig. 3.

Fig. 5 shows a modification wherein the supporting member is positioned in the bearing sleeves by means of packing pieces $d$.

A further modification is shown in Fig. 6 wherein a retaining screw $s$ is arranged so as to bear by end thrust against a bushing $h$ which surrounds the supporting member $t$.

Figures 4, 7:
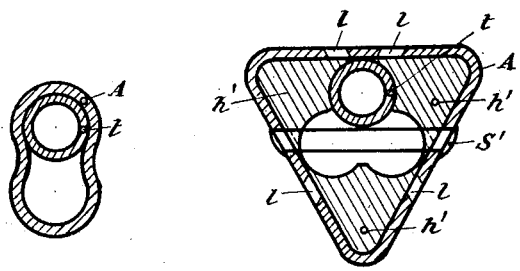

The provision of separate retaining elements may be avoided by a suitable modification of the shape of the bearing sleeves, for instance as shown in Fig. 7 wherein a deformation of the oval shape of the sleeve causes the latter to engage the supporting member over more than half its circumference.

The cross-sectional shape of the collecting member and bearing sleeves may be varied. Fig. 4 shows a triangular collecting member wherein packing pieces $h'$ are arranged so as to position the supporting member $t$ in the centre of either side of the triangle. The sleeve is provided with apertures $l$ adapted to receive a bolt $s'$ in three different positions for retaining the collecting members with any of its faces in contact with the electric conductor.

The construction of the collecting member may be varied also in other respects. For instance the collecting member may be solid or composed of separate plates and connected at the ends to bearing sleeves such as described.

I claim:

1. In a current collector of the character described for use with electric vehicles, the combination with a trolley frame of a collecting member comprising an axially elongated hollow plate structure threaded on the frame and provided with a plurality of flat contact surfaces, the ends of said structure being shaped so as to act as bearing members for supporting the collecting member on the frame in different asymmetric positions.

2. The device claimed in claim 1 in combination with bolts inserted in the ends of the collecting member for maintaining the latter permanently in one of its asymmetric positions.

3. The device claimed in claim 1 in combination with a bolt passed crosswise through each end of the collecting member so as to maintain the latter permanently in one of its asymmetric positions, the collecting member being provided for each position with separate slots for the reception of the bolts.

4. The device claimed in claim 1 in combination with wearing bushes fitted in the ends of the collecting member.

JULIUS FISCHER DE TÓVÁROS.